No. 779,971. PATENTED JAN. 10, 1905.
L. P. ROUTT.
CREDIT COUPON BOOK.
APPLICATION FILED MAR. 28, 1904.
2 SHEETS—SHEET 1.
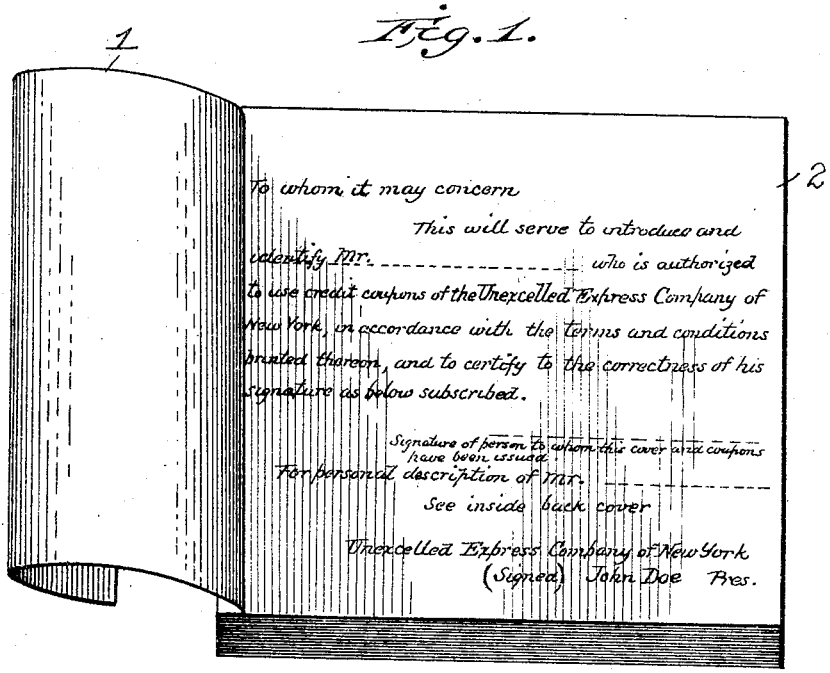
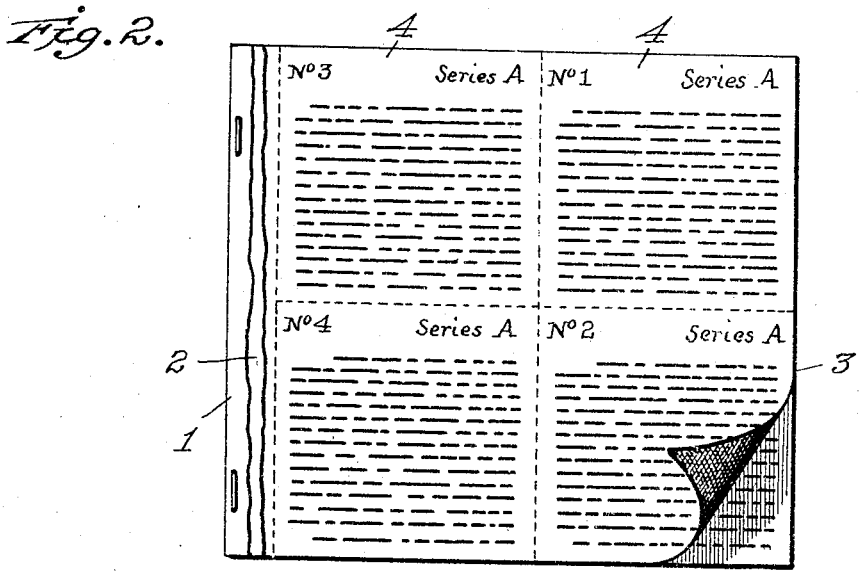

No. 779,971. PATENTED JAN. 10, 1905.
L. P. ROUTT.
CREDIT COUPON BOOK.
APPLICATION FILED MAR. 28, 1904.
2 SHEETS—SHEET 2.
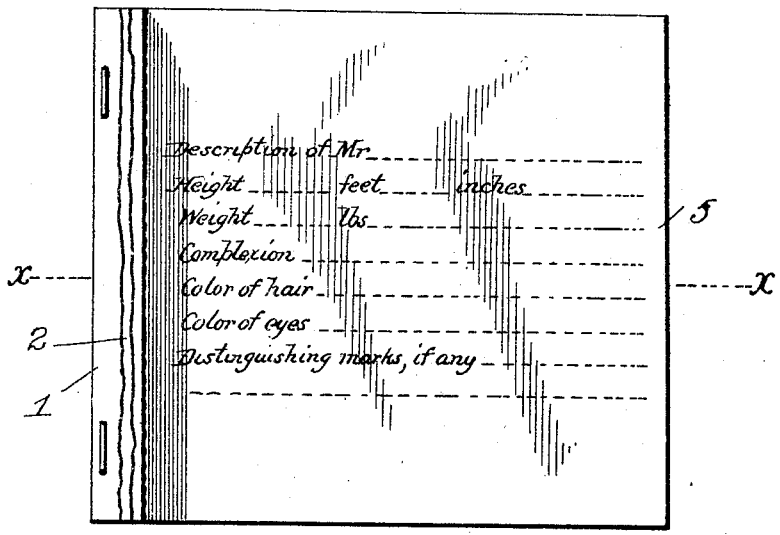
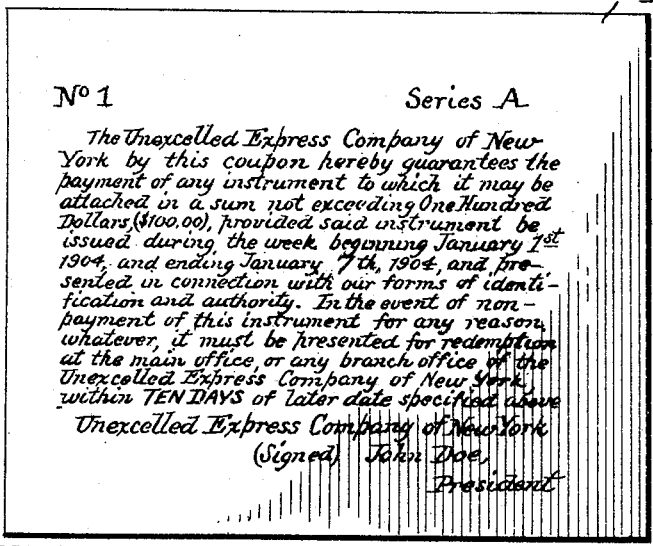
WITNESSES
INVENTOR
Attorney No. 779,971. Patented January 10, 1905.

UNITED STATES PATENT OFFICE.

LEROY P. ROUTT, OF RICHMOND, VIRGINIA, ASSIGNOR OF ONE-HALF TO THOMAS H. KILDUFF, OF BOSTON, MASSACHUSETTS.

CREDIT-COUPON BOOK.

SPECIFICATION forming part of Letters Patent No. 779,971, dated January 10, 1905.

Application filed March 28, 1904. Serial No. 200,340.

*To all whom it may concern:*

Be it known that I, LEROY P. ROUTT, a citizen of the United States, residing at Richmond, in the county of Henrico and State of Virginia, have invented new and useful Improvements in Credit-Coupon Books, of which the following is a specification.

This invention has for its object to enable responsible persons traveling on their own account for either business or pleasure or as representatives of responsible and well-rated firms or corporations to cash their paper in limited sums without trouble or question at banks, hotels, express-offices, telegraph-offices, or railroad ticket-offices.

In carrying out this invention a number of sheets made up of what I term "credit-coupons" are employed. Each of these coupons carries on its face a guarantee of payment of all or part of a specified sum of money within a specified limited period by an instrument to which a credit-coupon is affixed drawn by the party authorized to use the coupon. Each sheet may be formed of any number of these coupons desired, and each of these sets of coupons may vary from the others in the amount stated on the coupons of a particular sheet and in the time specified wherein payment may be made. In this way the sheets of credit-coupons may be made in series, so as to be usable for different amounts within different specified times, whereby payment of an instrument or instruments drawn within each week of the year for an amount or amounts not exceeding the total amount specified in each series of credit-coupons is guaranteed to the person authorized to draw the amount of the instrument to which a credit-coupon may be affixed. In connection with these credit-coupons is employed a letter of introduction, identification, authorization, and certification of the signature of the person entitled to use the credit-coupons and a form containing a description of said person.

To illustrate the manner of carrying out the invention, I have shown it in the accompanying drawings in the form of a coupon-book, in which—

Figure 1 is a perspective view of the coupon-book with front cover open. Fig. 2 is a plan view of the coupon-book, showing cover and first page removed and disclosing a sheet of coupons. Fig. 3 is a similar view showing the identification-page. Fig. 4 is a sectional view on the line $x\,x$ of Fig. 3. Fig. 5 is an enlarged detail view of one of the coupons.

The coupon-book herein set forth is provided with covers 1, a letter 2 of introduction, identification, authorization, and certification of the signature of the person entitled to use the credit-coupons, for example, as follows:

*To whom it may concern:*

This will serve to introduce and identify Mr...................., who is authorized to use credit-coupons of the Unexcelled Express Company of New York, in accordance with the terms and conditions printed thereon, and to certify to the correctness of his signature as below subscribed.

..............................
(Signature of person to whom this cover and coupons have been issued.)

For personal description of Mr............
.......... see inside back cover.

UNEXCELLED EXPRESS COMPANY
         OF NEW YORK.

(Signed) JOHN DOE,
    *President.*

The book is further provided with a number of sheets 3 of credit-coupons 4—as, for example, thirteen sheets of four credit-coupons each, beginning with No. 1, dated and eligible for use during the first week in January, and so on for each week of each month of the year. For example, Series A will guarantee the payment of any single instrument when drawn within the dates specified for an amount not exceeding one hundred dollars. Series B, C, D, &c., will in like manner be distinguished by other dates and amounts. The credit-coupons 4 will be engraved on gummed sheets and detachable, similarly to postage-stamps. Each coupon will contain a guarantee in some such form as this:

No. 3.    (Vignette.)    Series A.

The Unexcelled Express Company of New York by this coupon hereby guarantees the payment of any instrument to which it may be attached in a sum not exceeding one hundred dollars ($100.00) provided said instrument be issued during the week beginning January 15, 1904, and ending January 21, 1904, and presented in connection with our forms of identification and authority. In the event of non-payment of this instrument for any reason whatever, it must be presented for redemption at the main office, or any branch office, of the Unexcelled Express Company of New York within ten days of later date specified above.

UNEXCELLED EXPRESS COMPANY
          OF NEW YORK.
 (Signed) JOHN DOE,
     *President*.

The credit-coupons 4 preferably contain a time and limit value, but may be used without it, the main object being to enable the representatives of firms or substantial individuals to carry with them in a portable and convenient shape the guarantee of some recognized responsible company available only for their personal use. The issuing party, whose credit is firmly established, enables the holder of its credit-coupons to cash his check or draft without question.

The advantages to be derived are manifold: First, while John Doe is looked upon with more or less favor by his employer, still by reason of the fact that he covers a large stretch of territory and at times is compelled to move quickly it is impossible for him to arrange a reasonably sure route-list. By using credit-coupons issued against the rating and reputation of his employer the necessity of starting him out with a large sum of money is obviated. If John Doe is not thoroughly trusted by his employer, he can be started with one sheet, or four coupons, and the letter of introduction, the remainder, or forty-eight coupons, being in the custody of his employer and being mailed to certain addresses from time to time in lots of four each. The advantage to the employer is, in using the credit-coupon system, that he does not run the risk of loss nor subject his employees to temptation, as is the case in the ordinary way when, for example, a firm is traveling forty men each of whom carries from three to five hundred dollars in currency, checks, or money-orders of some description, all of which is immediately available. This idea will be readily susceptible of use in the requirements of a foreign representative making purchases on behalf of American firms in the European markets, the employer being able to use for an agreed fee the certification of the company, thereby keeping a large sum of money immediately under his own control and avoiding loss of interest. Another attractive feature of this plan would be that if, for example, the coupons were issued by some well-known express company the instructions would embody notice that checks or drafts of this nature could be cashed on sight at any of their branch offices, a nominal collection fee being deducted from the amount paid. Thus the issuing company would receive a fee for the use of its credit, and another for the use of its funds. The ultimate form of this plan will probably be the issuance of these coupons by some express company or association of express companies or banking institutions, the risks involved being protected by a surety, guaranty, or credit company.

5 is the identification sheet or blank form to be filled up with the data, description, height, weight, &c., of the person referred to in the letter of introduction 2.

I claim—

1. A credit-coupon book, comprising a letter of introduction, authorization, and certificate of signature, and a number of credit-coupons, each bearing a statement consisting of a guarantee of the payment of any instrument to which it may be attached, in any amount not exceeding an amount specified on the coupon, provided it is used within a specified period.

2. A credit-coupon book, comprising a letter of introduction, identification, authorization, and certificate of signature, and a number of sheets of credit-coupons, each coupon bearing a statement consisting of a guarantee of payment of any instrument to which it may be attached, in any amount not exceeding a sum specified on the coupon, provided it is used within a specified period, said sheets being in series, each series differing from another in the credits and time limitations specified thereon.

3. A guaranteeing credit-coupon, bearing a statement, guaranteeing the payment of any instrument to which it may be attached, in any sum, not exceeding an amount specified on the coupon, and payable within a period specified on the coupon; and also bearing the statement, "and presented in connection with our forms of identification, and authority."

4. A guaranteeing credit-coupon, bearing a statement consisting of a guarantee of payment of any instrument to which it may be attached, in any sum, not exceeding an amount specified on the coupon, provided it is used within a specified period, and in case of non-payment that it is redeemable within a specified time.

In testimony whereof I have signed my name to this specification in the presence of two subscribing witnesses.

LEROY P. ROUTT.

Witnesses:
 EDWIN P. COX,
 JOHN P. LEA.